United States Patent Office 2,937,195
Patented May 17, 1960

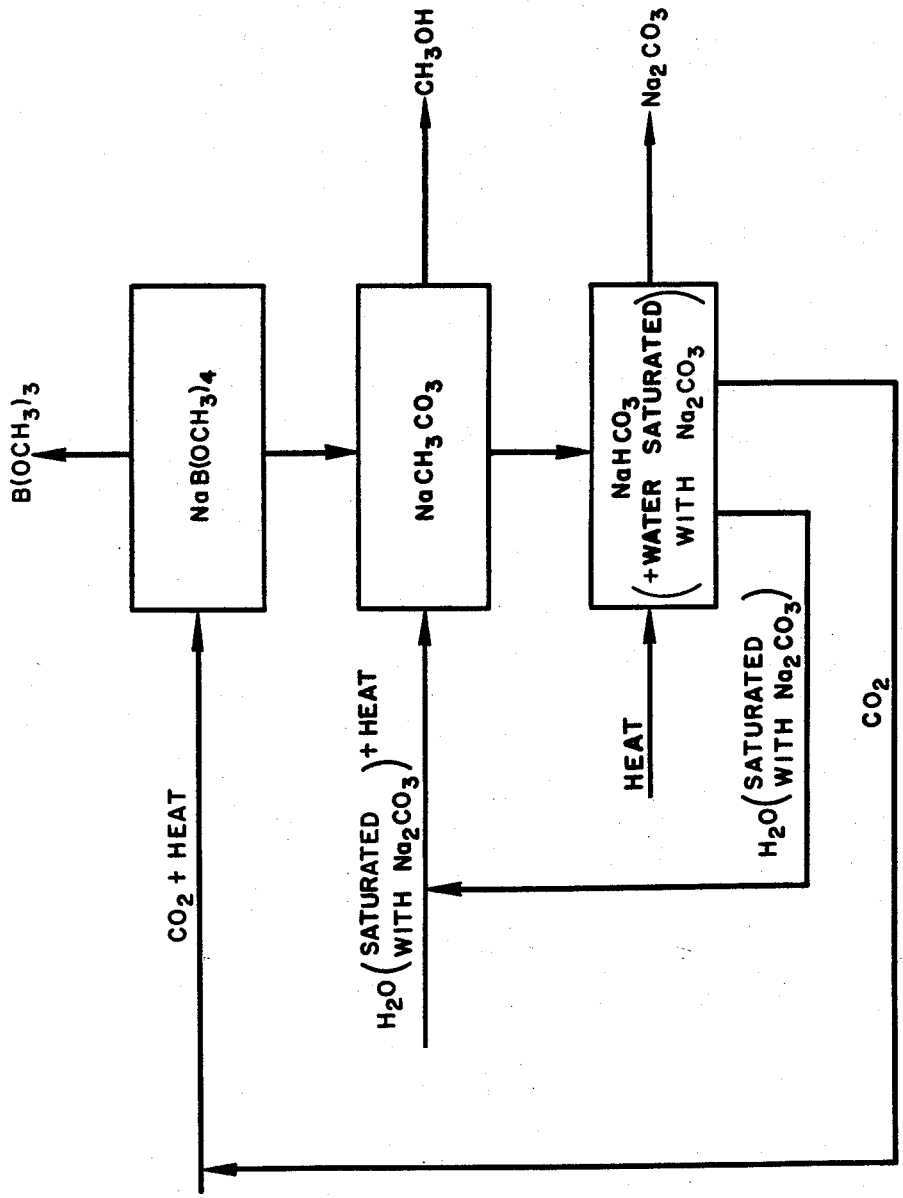

2,937,195

RECOVERY OF TRIMETHYL BORATE FROM SODIUM TETRAMETHOXYBORATE

Roy M. Adams, Darlington, and William H. Schechter, Zelienople, Pa., assignors, by direct and mesne assignments, to Callery Chemical Company, Pittsburgh, Pa., a corporation of Pennsylvania Application October 20, 1954, Serial No. 463,584

8 Claims. (Cl. 260—462)

This invention relates to a process for recovering trimethyl borate from sodium tertamethoxyborate by reaction of the latter compound with carbon dioxide.

Sodium tetramethoxyborate [$NaB(OCH_3)_4$] is a by-product in the manufacture of several boron compounds using trimethyl borate as a starting material. In order to make such processes economical, it is necessary to recover the trimethyl borate from the sodium tetramethoxyborate formed.

It is therefore an object of this invention to provide a new and improved method for recovering trimethyl borate from sodium tetramethoxyborate which is simple and economical to perform.

Another object is to provide a new and improved method whereby sodium tetramethoxyborate is reacted with carbon dioxide to liberate trimethyl borate in substantially quantitative yield.

Other objects will become apparent throughout the specification and claims hereinafter related.

This new and improved method will be completely described in the specification and the novelty thereof will be particularly pointed out and distinctly claimed.

In the accompanying drawing there is shown a flow diagram illustrating this process.

This invention is based upon our discovery that when carbon dioxide gas is reacted with sodium tetramethoxyborate [$NaB(OCH_3)_4$], sodium methyl carbonate [$NaCH_3CO_3$] is formed and trimethyl borate is evolved and can be collected in a Dry Ice-acetone cold trap. The solid sodium methyl carbonate which is formed can be hydrolyzed to sodium bicarbonate and methyl alcohol. By heating the sodium bicarbonate, carbon dioxide is evolved which can be used to react with more sodium tetramethoxyborate and the cycle repeated.

The overall process as developed can be summarized as follows:

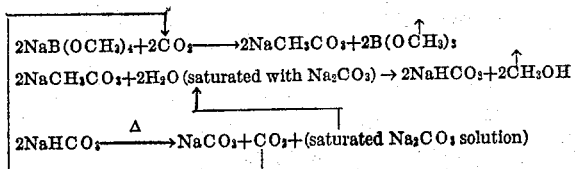

It should be noted that this cyclic process is self-contained and that the only materials added are sodium tetramethoxyborate, water, and one-half of the carbon dioxide required for the first reaction. The products obtained are trimethyl borate, methyl alcohol and sodium carbonate. By carrying out the hydrolysis of the sodium methyl carbonate with a saturated solution of sodium carbonate in water the sodium bicarbonate formed (and later in the process the sodium carbonate) will not go into solution. The overall yields are substantially quantitative.

In one experiment solid sodium tetramethoxyborate was reacted with dry carbon dioxide gas in a Pyrex tube. Trimethyl borate was evolved and collected in a cold trap. About 87% of the theoretical amount of trimethyl borate was obtained. Sodium methyl carbonate ($NaCH_3CO_3$) remained as a residue after evolution of the trimethyl borate. The sodium methyl carbonate residue was added to a substantially saturated aqueous solution of sodium carbonate and heated to 75° C. to distill off the methyl alcohol. The sodium bicarbonate produced in this second step reacts with the sodium carbonate in solution to precipitate sodium sesquicarbonate thus forming a slurry. This slurry was heated at about 105° C. to cause the evolution of carbon dioxide and leave a sodium carbonate residue. This slurry was filtered and the filtrate ($Na_2CO_3$ solution) recycled to hydrolyze more of the sodium methyl carbonate.

In another experiment the sodium tetramethoxyborate was dissolved in methanol and carbonated with dry $CO_2$ to precipitate crystalline sodium methyl carbonate and evolve trimethyl borate. The trimethyl borate liberated was recovered as azeotrope. If the carbonation is carried out using trimethyl borate-methanol azeotrope as solvent the trimethyl borate liberated from the sodium tetramethoxyborate can be recovered by distillation.

Other experiments have demonstrated that this process can be carried out in water and in various organic solvents either in suspension or in solution. When this process is carried out in water as the reaction medium a stoichiometric amount of water is used and the reaction apparently goes through the following steps: (1) the tetramethoxyborate is hydrolyzed to $NaBO_2$ and $CH_3OH$, (2) the $CO_2$ converts the $NaBO_2$ to $Na_2B_4O_7$ and $Na_2CO_3$, and (3) the $Na_2B_4O_7$ reacts with the $CH_3OH$, and the azeotrope $CH_3OH \cdot B(OCH_3)_3$ is distilled from the reaction mixture. When the process is carried out in an inert organic solvent the tetramethoxyborate is more easily handled than in the dry state but $NaCH_3CO_3$ is precipitated and must be filtered and subjected to a separate hydrolysis reaction as in the dry reaction. It has been found that this reaction will take place at room temperature in the dry state or in an inert solvent with trimethyl borate separating from the sodium methyl carbonate which is formed. When the reaction is carried out at higher temperatures the trimethyl borate is distilled from the reaction mixture and can be condensed and recovered.

Having thus described our invention and the manner in which it is to be performed, it should be understood that within the scope of the claims appended hereto this invention may be practiced otherwise than as specifically described. What we desire to claim and secure by Letters Patent of the United States is:

1. A method comprising reacting sodium tetramethoxyborate with carbon dioxide to produce trimethyl borate, and recovering the resultant borate from the reaction zone.

2. A method according to claim 1 in which the sodium tetramethoxyborate is suspended in an inert liquid.

3. A method according to claim 1 in which the trimethylborate is evaporated from the reaction mixture and recovered by condensation.

4. A method according to claim 1 in which the sodium tetramethoxyborate is dissolved in an inert solvent.

5. A method according to claim 4 in which the solvent is methanol and the trimethyl borate is recovered as azeotrope.

6. A method according to claim 4 in which the solvent is trimethyl borate-methanol azeotrope and the trimethyl borate is recovered by distillation of the azeotrope from the reaction mixture.

7. A method comprising reacting dry sodium tetramethoxyborate with dry carbon dioxide to form sodium methyl carbonate and to evolve trimethyl borate, condensing and recovering said trimethyl borate, and recovering said sodium methyl carbonate from said reaction zone.

8. A method comprising reacting sodium tetramethoxyborate with carbon dioxide in the presence of a stoichiometric amount of water, whereby methanol and trimethyl borate are formed, and recovering the trimethyl borate thus formed as an azeotrope with methanol.

References Cited in the file of this patent

UNITED STATES PATENTS 2,088,935     Vaughn              Aug. 3, 1937

OTHER REFERENCES

Brown et al.: "American Chemical Society Journal," vol. 75 (1953), pages 192 to 194.